Oct. 11, 1932.                    S. JENCICK                      1,882,633
                           HYDRAULIC SHOCK ABSORBER
                              Filed Jan. 14, 1929
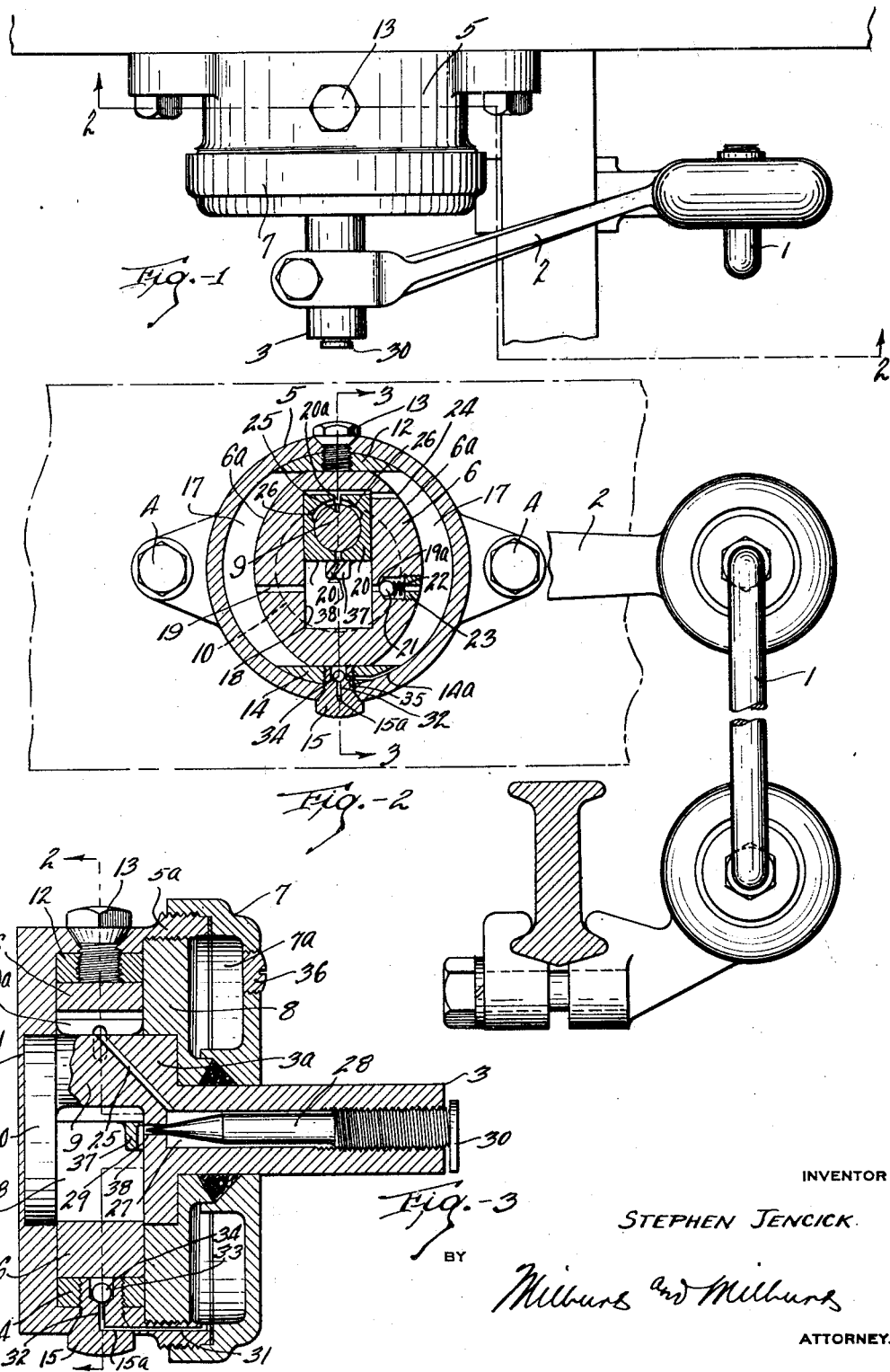
INVENTOR
STEPHEN JENCICK
BY
Milburn and Milburn
ATTORNEYS.

Patented Oct. 11, 1932

1,882,633

UNITED STATES PATENT OFFICE

STEPHEN JENCICK, OF CHAGRIN FALLS, OHIO

HYDRAULIC SHOCK ABSORBER

Application filed January 14, 1929. Serial No. 332,414.

This invention relates to an improved form of hydraulic shock absorber.

The object of the present invention is to devise a hydraulic shock absorber which is capable of maximum efficiency; which can be applied to any size of automobile or the like, which possesses a comparatively wide range of variation as to the degree of compression according to the duty required; which will not lock and can be depended upon for efficient operation during all seasons of the year; which, at the same time, is of comparatively small dimensions and requires minimum space for operation; and which can be sold at comparatively low cost.

In addition to the several objects of invention which have been briefly stated, other objects and advantages will be apparent from the following description and claims when considered together with the accompanying drawing.

Fig. 1 is a top plan view; Fig. 2 is a vertical sectional view of my improved device showing some parts in elevation and corresponding to line 2—2 of Fig. 1; and Fig. 3 is a transverse sectional view through the main body of the shock absorber and taken on line 3—3 of Fig. 2.

The present invention is an improvement upon that disclosed in my co-pending U. S. application, Serial No. 253,132, filed February 9, 1928, the general principle of operation being the same in the two cases. Here, as in the other application and as will be readily understood by those who are familiar with the art of shock absorbers, the main part of the device is rigidly secured to the frame of the automobile or other vehicle and has lever connection with the axle of the car. Referring to the drawing, the link 1 has its lower end connected by universal joint to an arm on the axle of the automobile while its upper end has universal connection with the transverse lever arm 2 which has its other end rigidly secured to the axially disposed arm or shaft 3 of one of the relatively movable parts of the shock absorber itself. Rigidly mounted upon the body of the automobile by means of the oppositely disposed screws or bolts 4 is the cylindrical casing 5 in which the plunger 6 is arranged for straight-line movement. This plunger has operative connection with the arm 3, as will appear. This arm 3 extends through the outer cover member 7 which has screw-threaded engagement with the cylindrical casing 5 and extends also through the inner cover 8 which also has screw-threaded engagement with the inner surface of the annular flange portion 5ª of the casing 5. The inner surface of the cover 8 has a centrally disposed circular bearing seat to accommodate the correspondingly formed bearing 3ª which is provided as an integral part of the axially disposed arm 3. Formed integrally with the bearing 3ª, there is provided the eccentrically disposed crank 9 which is integrally connected at its other end with the radially disposed flat-sided portion 10 which is adapted to snugly fit and engage in the correspondingly formed slot in the circular bearing member 11 which is oppositely disposed to and corresponds with the first bearing member 3ª. The bearing member 11 is adapted for seating engagement in the correspondingly formed circular depression provided in the opposite inner wall of the casing 5. Thus, the axially disposed arm 3 is adapted for relative rotatable movement with respect to the casing 5 by virtue of the bearing engagement in the casing, as just described.

Arranged within the top part of the casing 5, as viewed in the drawing, there is secured the block 12 by means of the screw 13. Likewise, in the bottom part of the casing 5 and diametrically disposed with respect to the block 12, there is provided a like block 14 which is secured in position by means of the screw 15. The inner surfaces of these two blocks have plain, parallel faces which are adapted to serve as a guide means for the correspondingly flat, parallel faces upon the upper and lower end portions of the plunger 6. The surfaces 6ª of this plunger are curved eccentrically with respect to the center of the casing, and the plunger is adapted for transverse straight-line sliding movement, as viewed in the present illustration, so as to compress the fluid between its curved surfaces 6ª and the concentrically disposed inner curved surfaces of the walls of the casing, that is, within the compression chambers indicated by reference numeral 17.

The other faces of plunger 6 have snug engagement with the flat end walls of the casing 5. Plunger 6 has a substantially rectangular-shaped opening 18 therethrough, the opposite vertical sides thereof being flat and parallel so as to accommodate a reciprocating valve for movement therein, as will be now explained. Opening 18 is slightly larger than portion 10 so as to facilitate assembly, as will appear. The valve is formed in two halves, each indicated by reference numeral 20, which are of like construction and which have their inner surfaces curved so as to engage about the crank portion 9. The adjacent edge portions of these complementary halves 20 are slightly spaced from each other for a purpose to be later explained. Extending through one side of the plunger 6 and at a point below the middle thereof, is the port 19 providing communication between the valve chamber 18 and one of the outer chambers 17. Extending through the opposite side of the plunger 6 and at an elevation corresponding substantially with the port 19, is another port 19ª with a ball valve 21 and a coil spring 22 which is maintained in position by means of the screw-threaded plug 23. The plunger 6 is provided also with the port 24 which affords communication between the valve chamber 18 and the chamber 17 above referred to. The port 24 is adapted for communication with the valve chamber 18 upon the side of the valve which is opposite to the side which has communication with the ports 19 and 20. By virtue of the space 20ª between the adjacent edge portions of the valve members 20, the valve chamber 18 upon the upper side of the valve, as viewed in Fig. 2 of the drawing, has communication with the restricted port 25 which extends diagonally, as viewed in Fig. 3, through crank arm 9 to the chamber 27 which is located at the base of and axially with respect to the operating arm 3. The channels 26 in the inner surfaces of the members 20 ensure this communication during all positions of the crank 9. The chamber 27 receives the needle valve 28 which is threaded into the arm 3 so as to control the port 29 which passes through the bearing member 3ª and opens into the valve chamber 18. The needle valve 28 is adapted for manipulation at its outer end, as indicated at 30.

The chambers above described are intended to be filled with oil of a suitable grade and a reservoir 7ª is provided between the cover 8 and the outer cover 7 so as to replenish the supply of oil within these chambers whenever may become necessary. As a means for automatically replenishing the quantity of oil in these chambers, I have provided the port 31 which has communication with the oil reservoir 7ª and extends transversely through the lower part of the casing, as viewed in Fig. 3 of the drawing, and has registering communication with a port 15ª in the head of the screw 15. This screw is provided also with an upwardly extending and inter-communicating port 32 which leads to a chamber 33 provided in the upper part thereof. Located within the chamber 33, is the ball valve 34 which is adapted to automatically control the flow of oil between the port 32 and the port 35 which extends through the side of the screw and registers with the port 14ª in the lower block 14. The port 14ª opens into the chamber 17. With this arrangement, it will be seen that oil will be automatically fed from the oil reservoir 7ª into the inner chamber 17, as may be necessary from time to time. This automatic replenishing of the oil is caused by suction due to the movement of the plunger in one direction so as to lift the ball valve 34 from its seat and to effect passage of the oil from the reservoir to chamber 17. The reverse movement of the plunger, however, will by virtue of pressure caused thereby through the intercommunicating ports and channels above referred to, cause the ball valve 34 to seat itself and thereby prevent escape of any of the oil from the chamber 17. Whenever may become necessary, the reserve supply of oil in the reservoir 7ª may be replenished through the opening in the outer cover 7 which is closed by the screw plug 36.

Relative movement between the body of the car and the axle due, for instance, to the wheels of the car entering a depression in the roadway, will cause a relative rotary movement between the arm 3 and the main casing 5 of the shock absorber, as above described. Such relative movement causes turning of the bearing members 3ª and 11 within the casing 5 which is fixed upon the frame of the car, and consequently the crank portion 9 is actuated so as to cause the valve members 20 surrounding the same to slide downwardly from the neutral position indicated in Fig. 2, and at the same time to cause the plunger 6 to move toward the left, (Fig. 2) and thereby cause compression of the oil in the chamber 17 between the oppositely disposed curved faces of the plunger and the casing. Part of the oil within this chamber 17 is thereby forced through the port 19 into the valve chamber 18 from which oil is, at the same time, forced past the ball valve 21 through the port 19ª into the opposite chamber 17. Thus, during the period of operation just now referred to, the compression of the oil is somewhat relieved by the passage of the same through the ports of the plunger as just now described, although there is actually effected sufficient compression between the curved surfaces of the plunger and the casing to relieve the shock and to thereby cause a cushioning action.

However, in the operation just now partially outlined, the greatest degree of compression has not yet been effected since the greatest shock would be experienced upon the so-called "rebound" of the body of the car, and the present shock absorber is so designed as to produce the greatest check or shock-absorbing effect during the upward movement of the body of the automobile so as to prevent the objectionable "rebound". As is well known, "rebound" is initiated by the action of the springs of the automobile which tend to force the body of the car upwardly, for instance, after it has been lowered by the entrance of the wheels of the car into a hole in the roadway. During such lowering of the body of the car, as just now referred to, the valve 20 has been lowered in the chamber 18, as viewed in Fig. 2, and oil has been permitted to find its way from the chamber 17 on the right-hand side of the plunger, (Fig. 2) through the port 24 and into that portion of the valve chamber 18 which is above the valve 23. Then, as soon as the body of the automobile begins to move upwardly, which would otherwise cause objectionable "rebound", relative movement between the parts of the present device is initiated in the reverse direction. That is, the valve 20 tends at once to move upwardly and at the same time to cause the plunger 6 to move towards the right, as viewed in Fig. 2 of the drawing. Having reached neutral position, represented in Fig. 2, the continued gradual upward movement of the body of the car will cause valve 20 to then move downwardly and towards the right, with the result that the plunger 6 is then moved farther toward the right so as to effect greater compression of oil in chamber 17 on the right, (Fig. 2). During the movement of the plunger 6 towards the right, the automatic action of the ball valve 21 will prevent passage of oil through the port 19ª and the only avenue of escape for the oil from the compression chamber 17 as the degree of compression continues to increase, is through the port 24, thence through the upper part of the chamber 18 which communicates through the space 20ª with the channel 26, and thence to the upper end of the restricted port 25, as viewed in Fig. 3. The other end of port 25, as before explained, opens into chamber 27. Thence the oil may pass through the port 29 into the lower part of the chamber 18 upon the under side of the valve 20. By setting the needle valve 28, the size of the opening through the port 29 may be controlled at will and thereby the degree of compression may be increased to any point desired, according to that required for the particular duty corresponding to any given type or size of automobile or the like. Thus, as the piston 6 continues to move toward the right, there is now effected the greatest degree of compression so as to prevent the objectionable "rebound".

As the valve 20 moves first towards the left and then towards the right as explained, it will be seen that the axis of the crank arm 9 approaches a point corresponding with the axis of the plunger, and that in each instance, the maximum degree of compression occurs at a time when these two axes correspond, with the result that the strain upon the parts and upon the mounting of the same is reduced to a minimum.

As a means of further controlling, regulating, and adjusting the degree and time of maximum compression through the ports, channels, and chambers just now referred to, during the so-called "rebound" period, I have provided an extension 37 upon the lower part of one of the valve members 20, which extension is formed with a channel 38 adapted for registering communication with the inner end of the port 29 during movement of the valve. The angle as well as shape or configuration of the channel 38 may be varied according to the exact period of time when it is desired to effect the greatest degree of compression or check, corresponding to the most severe point in what would otherwise be experienced as "rebound." There may be provided various valve members 20 with different forms of channels 38 which may be designed for use in the shock absorber for any particular automobile, truck, or the like, according to the considerations just now referred to. The particular form of valve member may be chosen and installed, as required, the shock absorber being otherwise the same within a wide range of duty.

By virtue of the compression of the oil between the curved surfaces which constitute the side walls of the compression chambers, there is effected a maximum degree of compression for a given relative movement between the parts. Furthermore, by having the opposite curved walls of these chambers eccentric to each other, there is effected a still greater degree of compression, especially through the port 24 which is placed at substantially one end, that is, the comparatively restricted part of the chamber. Furthermore, in the present construction, the straight line movement of the plunger is effected by means of the relative rotary movement between the parts thereof, which means that this device can be operated within a comparatively small space. Furthermore, because of the high degree of efficiency of which the present device is capable, the structure of the shock absorber itself is reduced to a comparatively compact form and size. Moreover, the several parts of the present structure are of such form that they can be easily machined to an extreme degree of accuracy which means a maximum degree of efficiency and a minimum degree of wear. The present structure is capable of operation with an oil which is proof against freezing within practical limits, and at the same time, the oil may be depended upon as a lubricating means for the several parts of the device. Thus, the device is reliable in its operation during all seasons of the year and requires practically no attention over a long period of time. The quantity of oil consumed during long usage is practically negligible. The parts, including the arrangement of the ports and chambers with respect to each other, have been so designed that smooth motion of the automobile is had at all times and the maximum degree of compression is effected at the most critical point of what would otherwise be considered objectionable "rebound." Moreover, this device can be operated so as to effectively check the "rebound" but without danger of locking or binding engagement between the parts. The present device may be operated during the turning of corners as well as along a straight course, since there is no danger of locking or binding between the relatively movable parts, as has been experienced in certain other types of hydraulic shock absorbers. Furthermore, the peculiar movement of the valve and of the crank member which actuates the same, is responsible for a very efficient balance of the main body of this device with respect to the main axis thereof so that the forces which are set up by the operation of this device are so balanced with respect to the axis that there is precluded any danger of serious strain upon the shock absorber. Consequently, the device may be attached to the body of the car without any more than usual degree of security and there is no danger of the device being torn loose from its points of attachment. Furthermore, long life of the entire device is ensured. The parts of the device are so formed as to facilitate assembling of the same and to afford efficient operation with respect to the bearings as well as the other parts. Finally, this device can be manufactured at comparatively low cost and hence recommends itself for use upon all grades and types of automobiles.

What I claim is:

1. A shock absorber comprising a fluid-containing cylindrical chamber, a reciprocatable piston therein, a valve mounted to slide in a transverse bore in the piston, means for controlling the flow of fluid from one side of the piston to the other, and an oscillating shaft disposed axially of said chamber and having direct operative connection with said valve for effecting reciprocating movement thereof and also of said piston.

2. A shock absorber comprising a fluid-containing cylinder, a piston having curved end surfaces and having reciprocating movement transversely of the axis of said cylinder, a valve mounted to slide in a transverse bore in the piston, means for controlling the flow of fluid from one side of the piston to the other, and an oscillating shaft having operative connection with said valve for effecting reciprocating movement thereof and also of said piston so as to compress the fluid between the oppositely disposed curved surfaces of the piston and the cylinder wall.

3. A shock absorber comprising a fluid-containing cylinder, a piston having curved end surfaces and having reciprocating movement transversely of the axis of said cylinder, a valve mounted to slide in a transverse bore in the piston, means for controlling the flow of fluid from one side of the piston to the other, and an oscillating shaft disposed axially of said chamber and having direct operative connection with said valve for effecting reciprocating movement thereof and also of said piston, so as to compress the fluid between the oppositely disposed curved surfaces of the piston and the cylinder wall.

4. A shock absorber comprising a fluid-containing cylinder, a piston having curved end surfaces and having reciprocating movement transversely of said cylinder, a valve mounted to slide in a transverse bore in the piston, means for controlling the flow of fluid from one side of the piston to the other, the curved surfaces of said piston being eccentric with respect to the curvature of the cylinder wall, and said fluid-control means having communication with the restricted part of the compression chamber between the curved surfaces of said piston and cylinder, and an oscillating shaft having operative connection with said valve for effecting reciprocating movement thereof and also of said piston so as to effect compression of the fluid.

5. A shock absorber comprising a fluid-containing cylinder, an oscillating shaft having bearings in the inner faces of the end walls of the cylinder, a piston in said cylinder and adapted for reciprocating movement therein, an eccentrically arranged crank extending between said bearings and through said piston and having operative connection with said piston so as to effect movement thereof upon actuation of said shaft, and means for effecting the flow of fluid from one side of the piston to the other.

6. A shock absorber comprising a fluid-containing cylinder, an oscillating shaft having bearings in the inner faces of the end walls of the cylinder, a piston having a substantially rectangular opening therethrough in the direction of the longitudinal axis of the cylinder, said piston being adapted for reciprocating movement in said cylinder in a direction transversely of the longitudinal axis of said cylinder, an eccentrically arranged crank extending between said bearings and through the opening in said piston, a slidable means arranged for movement in said opening and surrounding said crank for operation thereby whereby actuation of said shaft will effect reciprocation of said piston, and means for effecting the flow of fluid from one side of the piston to the other.

7. A shock absorber comprising a fluid-containing cylinder, a piston having curved end surfaces and having reciprocating movement transversely of the axis of said cylinder for compression of the fluid between the oppositely disposed curved surfaces of the piston and the cylinder wall, and means for automatically effecting less flow of fluid from one side of the piston to the other during rebound and greater flow in the opposite direction.

8. A shock absorber comprising a fluid-containing chamber, a reciprocatable piston therein, a valve mounted to slide in a transverse bore in the piston, means for effecting the flow of fluid from one side of the piston to the other and from one side of said valve to the other, adjustable means for regulating the flow from one side of the valve to the other, and within the piston, and an oscillating shaft having operative connection with said valve for effecting reciprocating movement thereof and also of said piston.

9. A shock absorber comprising a fluid-containing chamber, a reciprocatable piston therein, a valve mounted to slide in a transverse bore in the piston, means whereby movement of the piston in one direction will effect flow of the fluid from one side of the piston to said transverse bore on one side of said valve and thence to the other side of the piston and whereby movement of the piston in the opposite direction will effect flow of the fluid from said other side of the piston to the transverse bore on the other side of said valve and thence to the said one side of said valve and to the said one side of said piston, and an oscillating shaft having operative connection with said valve for effecting reciprocating movement thereof and also of said piston.

10. A shock absorber comprising a fluid-containing chamber, a reciprocatable piston therein, a valve mounted to slide in a transverse bore in the piston, said transverse bore upon one side of said valve having ports communicating with said chamber upon the opposite sides of said piston, one of said ports having a one-way valve permitting flow only outwardly to said chamber upon one side of said piston, a restricted means of communication between the chamber upon said one side of the piston and the transverse bore upon said one side of the valve, and an oscillating shaft having operative connection with said valve for effecting reciprocating movement thereof and also of said piston, said parts being so constructed and arranged that the said means of communication serves to restrict the return flow of fluid during the period of rebound.

11. A shock absorber comprising a fluid-containing chamber, a reciprocatable piston therein, a valve mounted to slide in a transverse bore in the piston, said transverse bore upon one side of said valve having ports communicating with said chamber upon the opposite sides of said piston, one of said ports having a one-way valve permitting flow only outwardly to said chamber upon one side of said piston, a restricted means of communication between the chamber upon said one side of the piston and the transverse bore upon said one side of the valve, means for regulating said means of communication, and an oscillating shaft having operative connection with said valve for effecting reciprocating movement thereof and also of said piston, said parts being so constructed and arranged that the said means of communication serves to restrict the return flow of fluid during the period of rebound.

12. A shock absorber comprising a fluid-containing chamber, a reciprocatable piston therein, a valve mounted to slide in a transverse bore in the piston, said transverse bore upon one side of said valve having ports communicating with said chamber upon the opposite sides of said piston, one of said ports having a one-way valve permitting flow only outwardly to said chamber upon one side of said piston, a restricted means of communication between the chamber upon said one side of the piston and the transverse bore upon said one side of the valve, means accessible from the outside for regulating said means of communication, and an oscillating shaft having operative connection with said valve for effecting reciprocating movement thereof and also of said piston, said parts being so constructed and arranged that the said means of communication serves to restrict the return flow of fluid during the period of rebound.

13. A shock absorber comprising a fluid-containing chamber, a reciprocatable piston therein, a valve mounted to slide in a transverse bore in the piston, said transverse bore upon one side of said valve having ports communicating with said chamber upon the opposite sides of said piston, one of said ports having a one-way valve permitting flow only outwardly to said chamber upon one side of said piston, a restricted means of communication between the chamber upon said one side of the piston and the transverse bore upon said one side of the valve, an oscillating shaft having operative connection with said valve for effecting reciprocating movement thereof and also of said piston, said parts being so constructed and arranged that the said means of communication serves to restrict the return flow of fluid during the period of rebound, and means for varying the time of maximum compression.

14. A shock absorber comprising a fluid-containing chamber, a reciprocatable piston therein, a valve mounted to slide in a transverse bore in the piston, said transverse bore upon one side of said valve having ports communicating with said chamber upon the opposite sides of said piston, one of said ports having a one-way valve permitting flow only outwardly to said chamber upon one side of said piston, a restricted means of communication between the chamber upon said one side of the piston and the transverse bore upon said one side of the valve, an oscillating shaft having operative connection with said valve for effecting reciprocating movement thereof and also of said piston, said parts being so constructed and arranged that the said means of communication serves to restrict the return flow of fluid during the period of rebound, and means for varying the degree and time of maximum compression.

15. A shock absorber comprising a fluid-containing chamber, a reciprocatable piston therein, a valve mounted to slide in transverse bore in the piston, said transverse bore upon one side of said valve having ports communicating with said chamber upon the opposite sides of said piston, one of said ports having a one-way valve permitting flow only outwardly to said chamber upon one side of said piston, a restricted means of communication between the chamber upon said one side of the piston and the transverse bore upon said one side of the valve, an oscillating shaft having operative connection with said valve for effecting reciprocatable movement thereof and also of said piston, said parts being so constructed and arranged that the said means of communication serves to restrict the return flow of fluid during the period of rebound, and means for varying the graduation of the compression during the period of rebound, according to the requirements of a given automobile or the like.

16. A shock absorber comprising a fluid-containing cylinder, a piston having curved end surfaces and having reciprocating movement transversely of said cylinder, a valve mounted to slide in a transverse bore in the piston, means for controlling the flow of fluid from one side of the piston to the other, an oscillating shaft having operative connection with said valve for effecting reciprocating movement thereof and also of said piston so as to compress the fluid between the oppositely disposed curved surfaces of the piston and the cylinder, and means extending axially of said shaft and accessible from the outside for regulating the degree of compression.

17. A shock absorber comprising a fluid-containing cylinder, a piston having curved end surfaces and having reciprocating movement transversely of the axis of said cylinder, a valve mounted to slide in a transverse bore in the piston, means for controlling the flow of fluid from one side of the piston to the other, and an oscillating shaft extending axially outwardly with respect to said cylinder and having operative connection with said valve for effecting reciprocating movement thereof and also of said piston so as to compress the fluid between the oppositely curved surfaces of the piston and the cylinder wall.

18. A shock absorber comprising a fluid-containing cylinder, a reciprocatable piston in said cylinder and adapted for movement along a line extending diametrically across the axis of said cylinder, an oscillating shaft having bearings in the end walls of said cylinder, an eccentrically arranged crank extending between said bearings and through said piston and having operative connection with said piston so as to effect movement thereof upon actuation of said shaft, and means for effecting flow of fluid from one side of the piston to the other, said parts being so constructed and arranged that at the time of maximum compression, the axis of the eccentric corresponds substantially with the axis of the piston.

19. A shock absorber comprising a fluid-containing chamber, a reciprocatable piston therein, a valve mounted to slide in a transverse bore in the piston, means for effecting the flow of fluid from one side of the piston to the other, said means including a port opening into said transverse bore, means accessible from the outside for regulating the flow through said port, and an oscillating shaft having operative connection with said valve for effecting reciprocating movement thereof and also of said piston.

20. A shock absorber comprising a fluid-containing chamber, a reciprocatable piston therein, a valve mounted to slide in a transverse bore in the piston, said transverse bore upon one side of said valve having ports communicating with said chamber upon the opposite sides of said piston, one of said ports having a one-way valve permitting flow only outwardly to said chamber upon one side of said piston, said ports being located beyond the limit of movement of said valve, a restricted means of communication between the chamber upon said one side of the piston and the transverse bore upon said one side of the valve, and an oscillating shaft having operative connection with said valve for effecting reciprocating movement thereof and also of said piston, said parts being so constructed and arranged that the said means of communication serves to restrict the return flow of fluid during the period of rebound.

In testimony whereof, I hereby affix my signature.

STEPHEN JENCICK.